US010567341B2

(12) United States Patent
Uchikawa (10) Patent No.: US 10,567,341 B2
(45) Date of Patent: Feb. 18, 2020

(54) INFORMATION PROCESSING APPARATUS CAPABLE OF RECEIVING EVENT, METHOD OF CONTROLLING THE SAME, AND STORAGE MEDIUM (71) Applicant: CANON KABUSHIKI KAISHA, Tokyo (JP)

(72) Inventor: Shinichi Uchikawa, Matsudo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 227 days.

(21) Appl. No.: 15/407,752

(22) Filed: Jan. 17, 2017

(65) Prior Publication Data
US 2017/0208036 A1 Jul. 20, 2017

(30) Foreign Application Priority Data

Jan. 20, 2016 (JP) .................................. 2016-008707

(51) Int. Cl.
H04L 29/06 (2006.01)
H04L 29/08 (2006.01)

(52) U.S. Cl.
CPC ........ H04L 63/0236 (2013.01); H04L 67/141 (2013.01); H04L 67/02 (2013.01)

(58) Field of Classification Search
CPC .................................................... H04L 63/236
USPC .......................................................... 726/13
See application file for complete search history.

(56) References Cited

U.S. PATENT DOCUMENTS

| 8,873,386 B2* | 10/2014 | Tuffin | H04L 47/746 370/230 |
|---|---|---|---|
| 2012/0166612 A1* | 6/2012 | Zhang | H04W 8/18 709/223 |
| 2014/0074977 A1 | 3/2014 | Niida | |
| 2015/0052576 A1* | 2/2015 | Togawa | H04L 63/0227 726/1 |
| 2017/0201545 A1 | 7/2017 | Nicodemus et al. | |
| 2017/0223011 A1 | 8/2017 | Schultz et al. | |

(Continued)

FOREIGN PATENT DOCUMENTS

EP 2109284 A1 * 10/2009 ......... H04L 63/0281
JP 2007257481 A 10/2007

OTHER PUBLICATIONS

Office Action issued in U.S. Appl. No. 15/602,281 dated Mar. 21, 2018.

(Continued)

Primary Examiner — Jacob Lipman
(74) Attorney, Agent, or Firm — Rossi, Kimms & McDowell LLP (57) ABSTRACT An information processing apparatus that makes it possible to avoid useless processing for registering an event which cannot be received. The information processing apparatus has a personal firewall function and receives an event registered concerning a network service. It is determined whether or not a reception address for receiving an event is a reception restriction target at which reception is rejected by the personal firewall. In a case where it is determined that the reception address is a reception restriction target before making a request to be registered as a recipient of an event, the registration is caused to fail without transmitting the request.

11 Claims, 7 Drawing Sheets (56) References Cited

U.S. PATENT DOCUMENTS

2017/0339566 A1 11/2017 Yasuda et al.
2017/0353432 A1 12/2017 Uchikawa

OTHER PUBLICATIONS

Notice of Allowance issued in U.S. Appl. No. 15/602,281 dated Oct. 12, 2018.

* cited by examiner

The designated event registration port number is a reception restriction target of the personal firewall.
Please change the reception restriction target of the personal firewall or the event registration port number.

OK

INFORMATION PROCESSING APPARATUS CAPABLE OF RECEIVING EVENT, METHOD OF CONTROLLING THE SAME, AND STORAGE MEDIUM

BACKGROUND OF THE INVENTION

Field of the Invention

The present invention relates to a technique for registering an event associated with a network service.

Description of the Related Art

Conventionally, there is a technique for asynchronously receiving an event generated on a terminal on a network, such as WS-Eventing (Web Services Eventing). In this technique, the contents of an event desired to be received and an event transmission destination (URL as an event reception address) are registered in an event transmission source. After the registration has been performed in the event transmission source, when an event generated at the event transmission source is detected, the generated event is notified to the event transmission destination thus registered.

In Japanese Patent Laid-Open Publication No. 2007-257481, there has been proposed a technique in which a printing device counts the number of times of failure in communication from an event transmission source to an event transmission destination, and when the number of times of failure reaches a predetermined value, the event transmission destination is deleted from the registration. Further, as another technique, to protect the system from network attack from a remote apparatus, some systems are equipped with a personal firewall function for restricting network communication from the outside to a computer. Note that the personal firewall function includes a type which does not uniformly restricts communication from remote apparatuses, but allows configuration to permit communication from a specific IP address or port number.

Let it be assumed that an information processing apparatus equipped with the personal firewall function is a terminal that is registered as an event transmission destination, and asynchronously receives an event generated on a terminal on a network. In this case, there is a problem that an event transmitted from the terminal as an event transmission source, e.g. an image forming apparatus, is blocked by the personal firewall. For example, in a case where a port number for receiving an event is among communication restriction targets restricted by the personal firewall, the information processing apparatus cannot receive the event. However, the port number (URL) used for notifying an event was registered in the image forming apparatus as the event transmission source by the information processing apparatus as the event recipient, and event reception registration was successfully performed. Therefore, the situation is that the event recipient is expecting that the event will be notified.

That is, although each event is transmitted to an event receiving section of the information processing apparatus based on the event reception registration, the information processing apparatus is incapable of knowing that the event has been discarded by the personal firewall, and hence the information processing apparatus continues to wait to receive events which cannot be received. Further, this means, as a result, that the registration of reception of the event which cannot be received is uselessly performed. Note that in the case of the technique disclosed in Japanese Patent Laid-Open Publication No. 2007-257481, the printing device makes an attempt to transmit the event to the destination which cannot receive the event at least once before the destination of the event transmission is deleted from the registration, and hence this causes useless processing to be performed.

SUMMARY OF THE INVENTION

The present invention provides an information processing apparatus that makes it possible to avoid useless processing for registering an event which cannot be received.

In a first aspect of the invention, there is provided an information processing apparatus that has a personal firewall function and receives an event registered concerning a network service, comprising a determination unit configured to determine whether or not a reception address for receiving an event is a reception restriction target at which reception is rejected by the personal firewall, and a registration request processing unit configured to cause, in a case where, before making a request for registration so as to be registered as a recipient of an event, it is determined by the determination unit that the reception address is a reception restriction target, the registration to fail without transmitting the request for the registration.

In a second aspect of the invention, there is provided a method of controlling an information processing apparatus that has a personal firewall function and receives an event registered concerning a network service, comprising determining whether or not a reception address for receiving an event is a reception restriction target at which reception is rejected by the personal firewall, and causing, in a case where, before making a request for registration so as to be registered as a recipient of an event, it is determined that the reception address is a reception restriction target, the registration to fail without transmitting the request for the registration.

In a third aspect of the invention, there is provided a non-transitory computer-readable storage medium storing a computer-executable program for executing a method of controlling an information processing apparatus that has a personal firewall function and receives an event registered concerning a network service, wherein the method comprises determining whether or not a reception address for receiving an event is a reception restriction target at which reception is rejected by the personal firewall, and causing, in a case where, before making a request for registration so as to be registered as a recipient of an event, it is determined that the reception address is a reception restriction target, the registration to fail without transmitting the request for the registration.

According to the present invention, it is possible to avoid useless processing for registering an event which cannot be received. Note that the reception address is not intended to mean only an IP address, but it should be regarded that it may be formed, for example, by an IP address and a port number.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. It should be noted that the present invention is not limited to the embodiments described below, and not all combinations of features described in the embodiments are absolutely essential to solution according to the invention.

Figure 1:
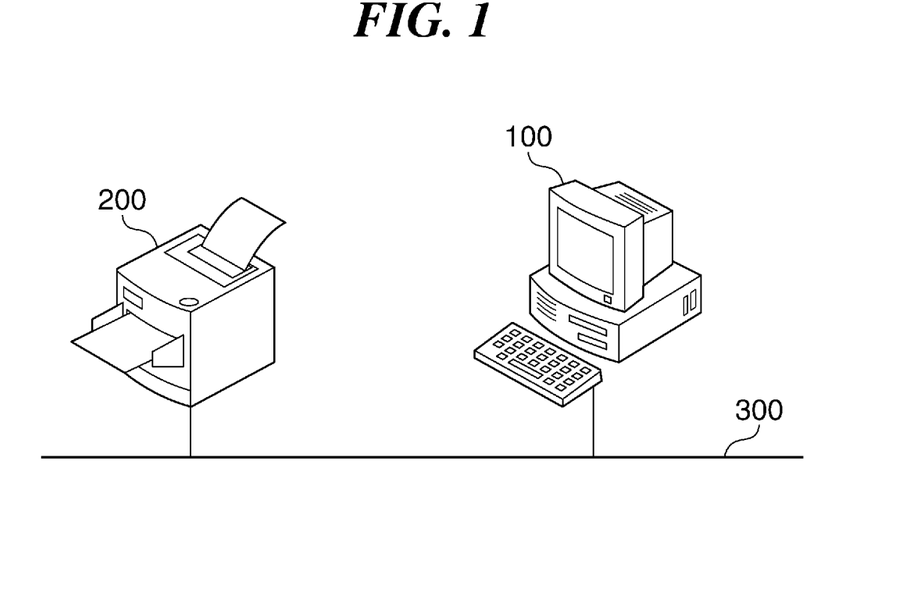
FIG. 1 is a schematic diagram of an event registration & reception system including an information processing apparatus.

FIG. 1 is a schematic diagram of an event registration & reception system including an information processing apparatus according to an embodiment of the present invention. This system is formed by connecting the information processing apparatus, denoted by reference numeral 100, and an image forming apparatus 200 via a network 300 communicably to each other.

Figure 2:
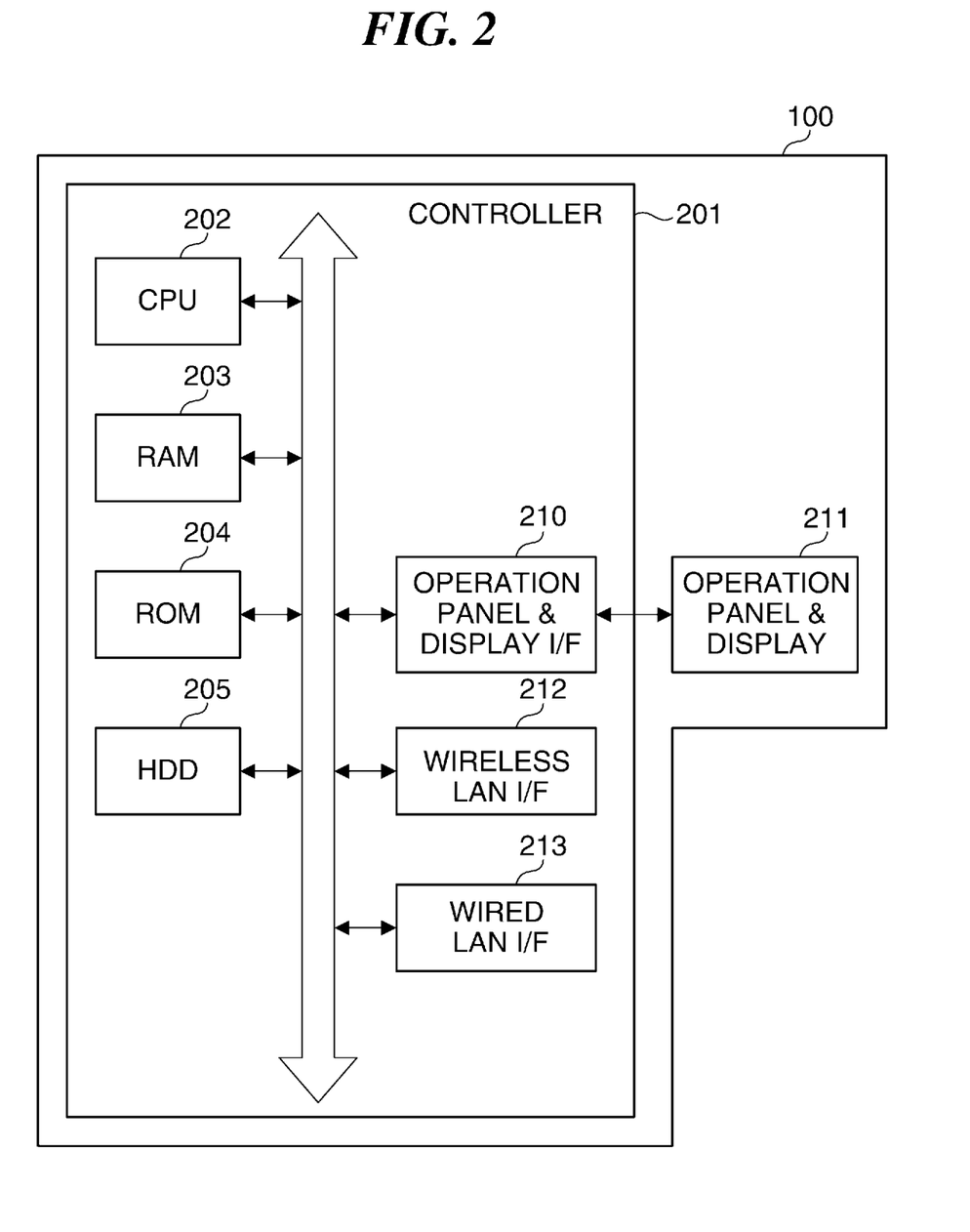
FIG. 2 is a diagram showing a hardware configuration of the information processing apparatus.

FIG. 2 is a diagram showing a hardware configuration of the information processing apparatus 100. A controller 201 includes a CPU 202. The controller 201 controls the overall operation of the information processing apparatus 100. The CPU 202 reads out control programs stored in a ROM 204 to perform various controls, such as communication control. A RAM 203 is used as a main memory and a temporary storage area, such as a work area, for the CPU 202. An HDD 205 stores data, various programs, and various information tables.

An operation panel & display interface 210 connects between an operation panel & display 211 and the controller 201. A wireless LAN interface 212 performs wireless communication with external apparatuses, such as a mobile terminal and a PC. A wired LAN interface 213 is connected to a LAN cable, and is capable of performing communication with external apparatuses. Note that the information processing apparatus 100 is configured such that one CPU 202 performs an event reception registration process, described hereinafter with reference to FIG. 5, and so forth, using one memory (RAM 203), but may have any other configuration. For example, the information processing apparatus 100 may be configured to perform the processes by causing a plurality of CPUs and a plurality of memories to cooperate with each other.

Figure 3:
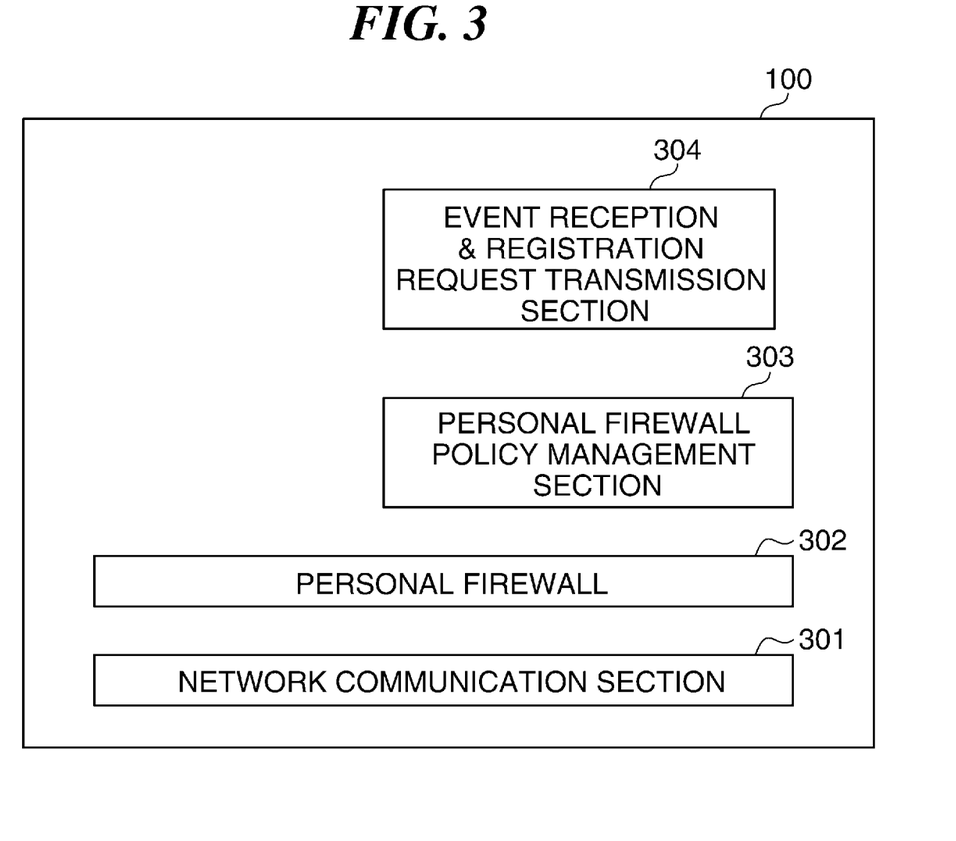
FIG. 3 is a diagram showing a software configuration of the information processing apparatus.

FIG. 3 is a diagram showing a software configuration of the information processing apparatus 100. The functional sections appearing in FIG. 3 are realized by the CPU 202 that executes the control programs stored in the ROM 204 or the HDD 205. A network communication section 301 controls wireless communication performed by the wireless LAN Interface 212, and controls wired communication performed by the wired LAN Interface 213. A personal firewall 302 is a function of restricting communication of the network communication section 301, and has two settings of restriction on transmission and restriction on reception. However, the personal firewall 302 is capable of releasing restriction of communication which satisfies a specific condition, according to settings stored in a personal firewall policy management section 303.

Figure 4:
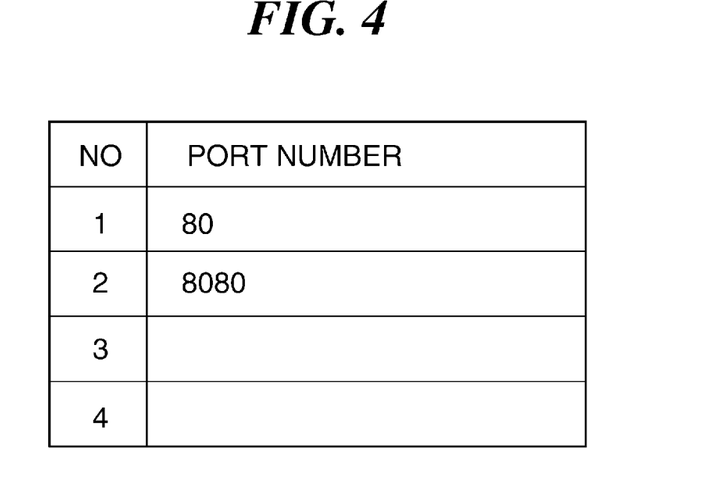
FIG. 4 is a diagram showing an example of a permission condition in reception settings.

The personal firewall policy management section 303 is capable of setting the enabling/disabling of the function of the personal firewall 302 according to a user's instruction. Further, the personal firewall policy management section 303 has the function of managing the restriction of communication, which is set by the personal firewall 302 as mentioned above. The restriction of communication by the personal firewall 302 is defined by a permission condition described in reception settings. For example, the permission condition is information defining a permission target at which reception is permitted, as shown in FIG. 4, i.e. information defining whether or not to permit reception with respect to a port number via which the information processing apparatus 100 performs communication. The setting of enabling/disabling the function of the personal firewall 302 and the permission condition in the reception settings shown in FIG. 4 are managed by the personal firewall policy management section 303.

In the illustrated example in FIG. 4, an item No. 1 indicates that communication performed via a port number 80 is permitted even when the reception restriction function of the personal firewall 302 is enabled. An item No. 2 also indicates that communication via a port number 8080 is permitted. Therefore, even when the personal firewall function is enabled, if the port number is a permission target, reception via the corresponding port number is permitted.

An event reception & registration request transmission section 304 (a determination unit, and a registration request processing unit) is capable of using a network service, and performs transmission of an event reception registration request and reception of an event, for the network service. The event reception & registration request transmission section 304 is also simplified as the "transmission & reception section 304" hereinafter.

Figure 5:
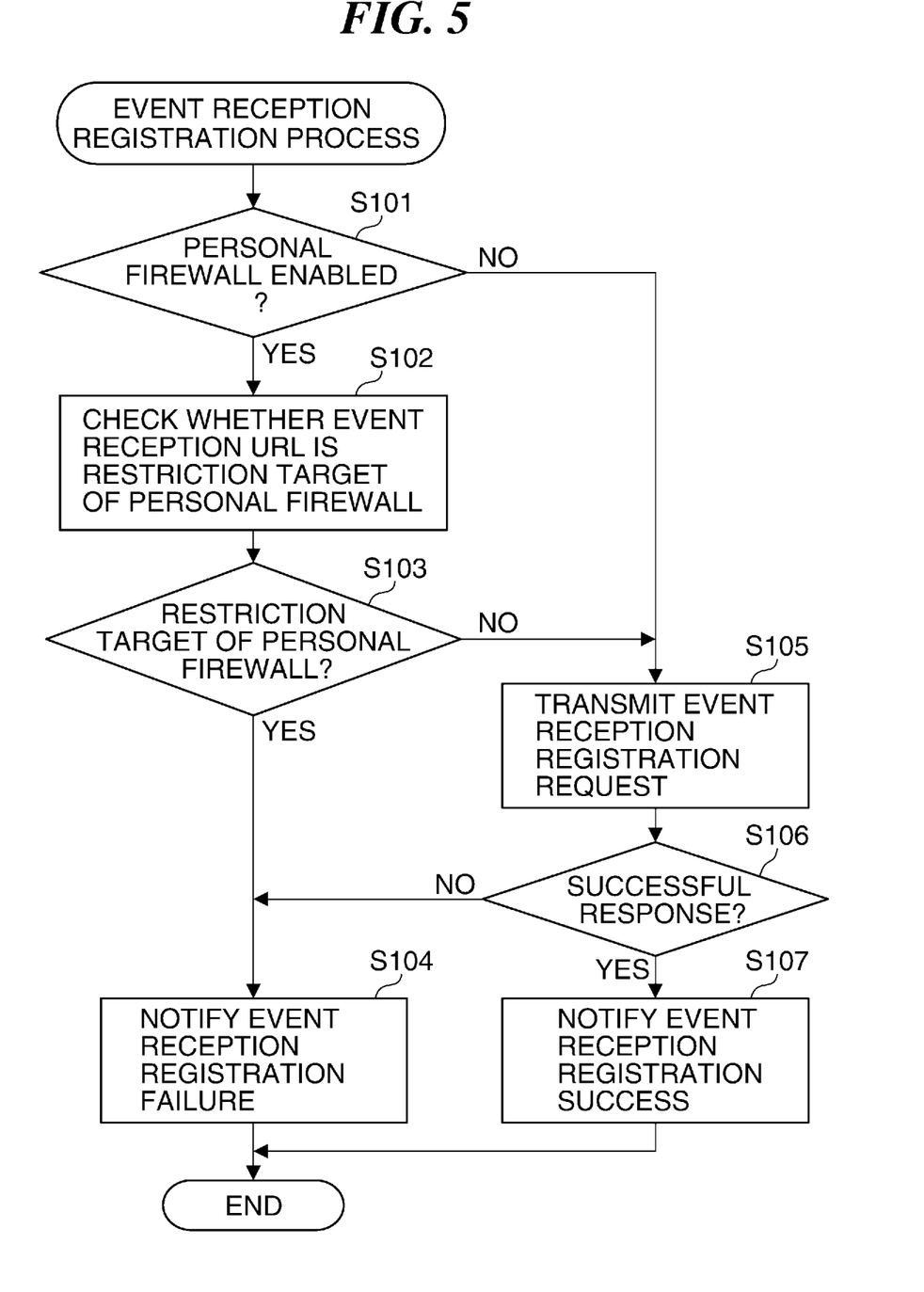
FIG. 5 is a flowchart of an event reception registration process.

FIG. 5 is a flowchart of an event reception registration process. The program for executing the event reception registration process is stored in the ROM 204 or the HDD 205, and is loaded into the RAM 203 so as to be executed by the CPU 202.

Before performing event reception registration with the image forming apparatus 200, the transmission & reception section 304 determines whether or not the reception restriction function of the personal firewall has been enabled (step S101). If it is determined in the step S101 that the reception restriction function of the personal firewall has been disabled, event reception registration by the user makes it possible to receive an event. Accordingly, the transmission & reception section 304 transmits an event reception registration request to the image forming apparatus 200 via the network communication section 301 (step S105). Then, the transmission & reception section 304 waits for reception of a response to the event reception registration request from the image forming apparatus 200, and determines whether or not the response indicates successful event reception registration (step S106). If the response to the event reception registration request indicates successful event reception registration, the transmission & reception section 304 judges that the event reception registration is successful, and notifies the user of the success of the event reception registration via the display on the operation panel & display 211 (step S107). Note that the event reception registration process in FIG. 5 may be terminated without notifying the user of the success of the event reception registration. On the other hand, if the response to the event reception registration request indicates an error or no response is received, i.e. the event reception registration is unsuccessful, the process proceeds to a step S104.

If it is determined in the step S101 that the reception restriction function of the personal firewall has been enabled, the process proceeds to a step S102. In the step S102, the transmission & reception section 304 checks whether or not an event reception URL (reception address) severing as a destination of event transmission by the image forming apparatus 200 for the information processing apparatus 100 to receive an event is a target restricted by the personal firewall (is not included in the permission targets) (step S102). More specifically, the transmission & reception section 304 extracts a host name (IP address) and a port number from the event reception URL, and checks whether or not the event reception URL is a restriction target based on whether or not these information items are included in the reception permission targets permitted by the personal firewall. The processing performed in the steps S101 and S102 for determining whether or not the event reception URL corresponds to a "reception restriction target" at which reception is rejected by the personal firewall will be described using specific event reception URLs by way of example.

For example, assuming that the event reception URL is "http://172.24.10.10:5000/wsd/event", the remote IP address is "172.24.10.10", and the port number is "5000". The transmission & reception section 304 consults the permission condition (see FIG. 4) registered in the personal firewall policy management section 303, and checks whether or not the port number is a permission target. In the illustrated example in FIG. 4, the port number 5000 is not included in the permission targets indicated by the permission condition in FIG. 4, and hence reception via the port number 5000 is not permitted by the personal firewall. Therefore, it is determined that this event reception URL is a restriction target.

Further, for example, assuming that the event reception URL is "http://172.24.10.10:80/wsd/event", the remote IP address is "172.24.10.10", and the port number is "80". In this case, in the illustrated example in FIG. 4, the port number 80 is included in the permission targets indicated by the permission condition in FIG. 4, and hence reception via the port number 80 is permitted by the personal firewall. Therefore, it is determined that this event reception URL is not a restriction target.

As described above, whether or not the event reception URL is a reception restriction target at which reception is rejected by the personal firewall is determined based on whether the personal firewall has been enabled or disabled and whether or not the event reception URL is included in the permission targets. More specifically, when the reception restriction function of the personal firewall has been enabled and also the event reception URL is not a permission target, it is determined that the event reception URL is a reception restriction target. Further, even when the reception restriction function has been enabled, if the event reception URL is a permission target, it is determined that the event reception URL is not a reception restriction target. Note that when the reception restriction function has been disabled, it is also determined that the event reception URL is not a reception restriction target.

Next, in a step S103, the CPU 202 determines, based on as a result of the check in the step S102, whether or not the event reception URL is a target restricted by the personal firewall, and if it is determined that the event reception URL is not a target restricted by the personal firewall (i.e. is a permission target), the event reception URL is not a reception restriction target. In this case, event reception registration makes it possible to receive an event, and hence the transmission & reception section 304 transmits an event reception registration request to the image forming apparatus 200 (step S105). On the other hand, if it is determined that the event reception URL is a target restricted by the personal firewall (i.e. is not a permission target), the event reception URL is a reception restriction target. In this case, even when event reception registration is performed, an event to be received is blocked by the personal firewall. Accordingly, to avoid useless registration processing, the transmission & reception section 304 performs a process for notifying the user of failure in event reception registration without transmitting an event reception registration request to the image forming apparatus 200 (step S104).

Figure 6:
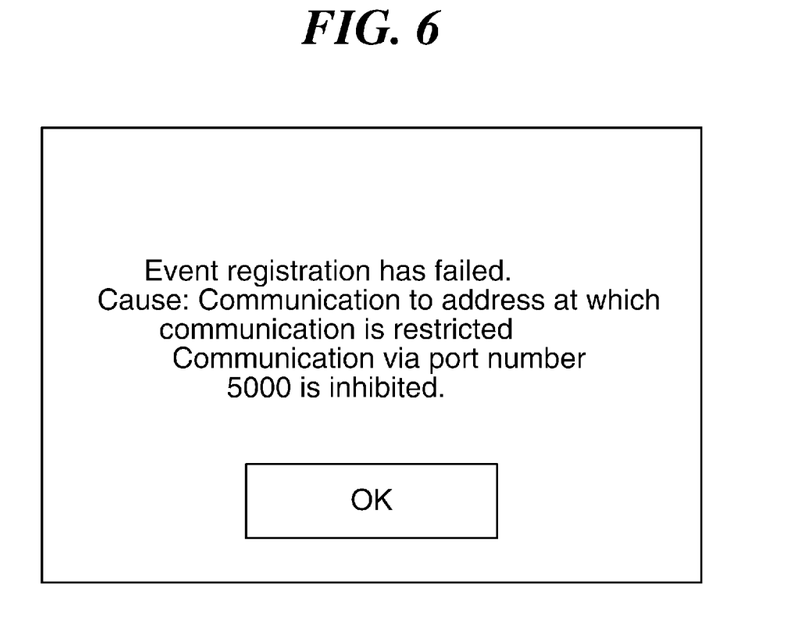
FIG. 6 is a diagram showing an example of the display of an error screen.

In the notification processing in the step S104, the transmission & reception section 304 causes an error screen as shown in FIG. 6 to be displayed on the operation panel & display 211. This screen displays information for notifying the user of failure in event reception registration together with a cause of the failure. Note that the error notification may be performed by voice or the like. Note that also when the step 104 is reached via the step S106, failure in registration is notified to the user together with a cause of the failure (e.g. an error response). This terminates the event reception registration process in FIG. 5.

Incidentally, if the event reception registration is successful, when an event registered in the image forming apparatus 200 is generated, the image forming apparatus 200 transmits the generated event to the registered event reception URL. The transmitted event is received by the transmission & reception section 304. For example, assuming that the registered event is a "printer status notification", if an error of no sheets to be output occurs in the image forming apparatus 200, the image forming apparatus 200 notifies "paper out information" to the event reception URL as an event. This enables the information processing apparatus 100 to know the status of the image forming apparatus 200.

According to the present embodiment, when performing event reception registration, if an event reception URL corresponds to a reception restriction target, the transmission & reception section 304 causes event reception registration to fail without transmitting an event reception registration request to the image forming apparatus 200. This makes it possible to avoid useless registration processing for registering reception of an event which cannot be received. Further, the transmission & reception section 304 transmits an event reception registration request if an event reception URL is not a reception restriction target, and hence it is possible to realize processing for registering reception of an event which can be received. Therefore, it is possible to eliminate a problem that the information processing apparatus 100 continues to wait for an event which has been registered in the image forming apparatus 200, but cannot be received due to the personal firewall function.

Further, even when the reception restriction function of the personal firewall has been enabled, if an event reception URL corresponds to a permission target, it is determined that the event reception URL is not a reception restriction target. Therefore, even when the reception restriction function has been enabled, it is possible to individually enable the event reception URL to receive an event.

Further, if event reception registration has failed, the failure is notified to the user, and hence it is possible to notify the user of the fact that event reception registration has failed.

A description will be given of a variation of the event reception registration process with reference to FIGS. 7 and 8.

Figure 7:
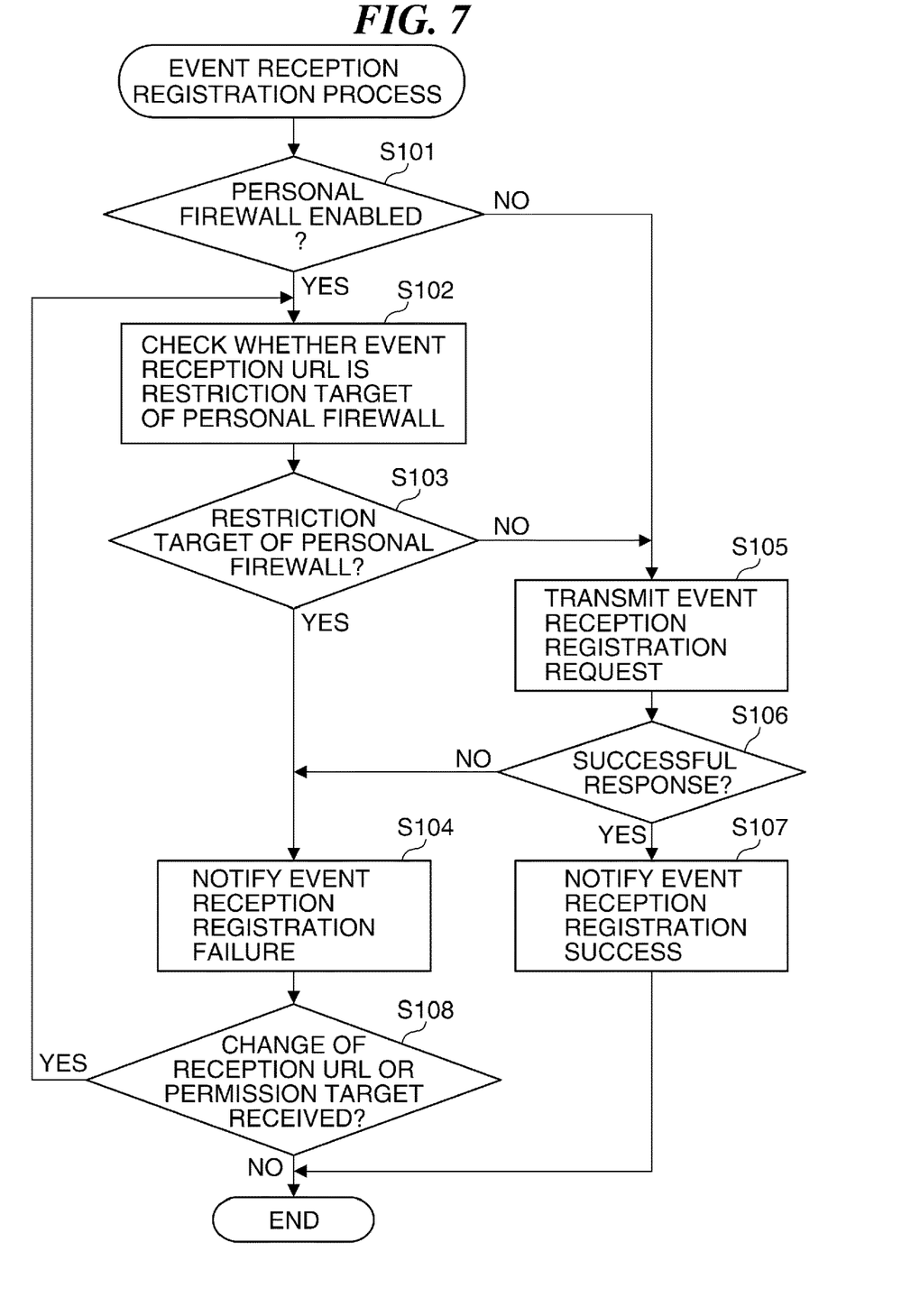
FIG. 7 is a flowchart of a variation of the event reception registration process shown in FIG. 5.
Figure 8:
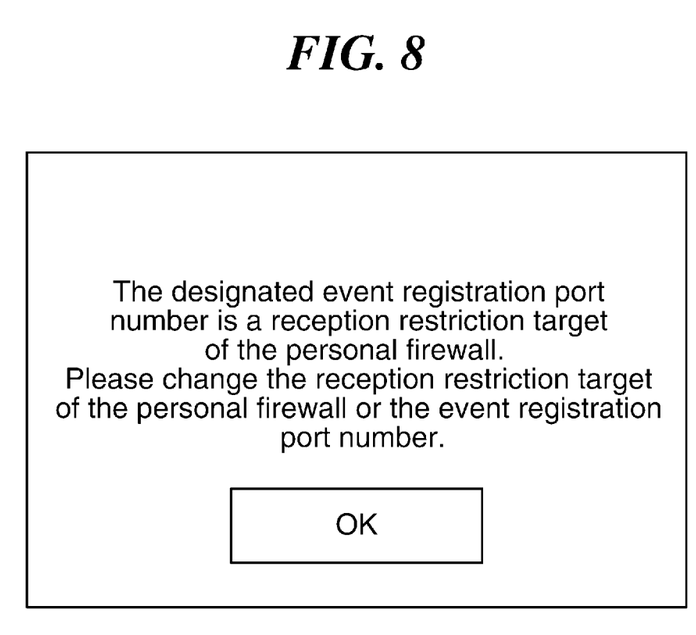
FIG. 8 is a diagram showing an example of the display of a screen for prompting a user to change settings.

FIG. 7 is a flowchart of a variation of the event reception registration process. The program for executing this event reception registration process is stored in the ROM 204 or the HDD 205, and is loaded into the RAM 203 so as to be executed by the CPU 202.

The steps S101 to S107 are the same as those described with reference to FIG. 5. However, in the step S104, the transmission & reception section 304 displays a screen, shown in FIG. 8, for prompting a user to change the setting, on the operation panel & display 211 in place of the error screen shown in FIG. 6, or after displaying the error screen shown in FIG. 6.

Here, the user can change the event reception URL or the permission target indicated by the permission condition, shown in FIG. 4, via the operation panel & display 211. The CPU 202 receives the change, and causes the received change to be reflected on the event reception URL of the transmission & reception section 304 or the permission condition (see FIG. 4) of the personal firewall 302. For example, when the user changes the port number of the event reception URL to another number, it is possible to exclude the event reception URL from the restriction target.

Therefore, after execution of the step S104, the transmission & reception section 304 determines whether or not the change of the event reception URL or the permission target has been received in a step S108. If it is determined in the step S108 that the change of the event reception URL or the permission target has been received, the transmission & reception section 304 returns the process to the step S102 with the changed setting state, whereby it is possible to try event reception registration again. On the other hand, if it is determined in the step S108 that the change of the event reception URL or the permission target has not been received, the event reception registration process in FIG. 7 is terminated.

According to this variation, in a case where event reception registration fails, it is possible to try to request event reception registration again, by using the changed event reception URL, or after changing the permission target, which makes it possible to register the event which can be received.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008707 filed Jan. 20, 2016, which is hereby incorporated by reference herein in its entirety.

What is claimed is:

1. A client terminal that has a personal firewall function and receives an event which is sent from a network service, comprising:
    a determination unit configured to determine whether or not a reception address of the client terminal to be used for receiving the event sent from the network service is a reception restriction target, at which reception would be rejected by the personal firewall function of the client terminal; and
    a request unit configured to transmit from the client terminal to the network service a registration request for registering in the network service the client terminal as a recipient of the event sent from the network service,
    wherein upon condition that it is determined by said determination unit that the reception address of the client terminal is a reception restriction target, said request unit terminates processing regarding registration of the client terminal as a error processing without transmitting the registration request to the network service, and
    wherein upon condition that it is determined by said determination unit that the reception address is not a reception restriction target, said request unit transmits the registration request from the client terminal to the network service.

2. The client terminal according to claim 1 comprising a notification unit configured to notify, in a case where the registration fails, the failure in the registration.

3. The client terminal according to claim 1, wherein in a case where the registration fails and the reception address is changed, said registration request processing unit tries making the registration request again after the reception address is changed.

4. The client terminal according to claim 1, wherein the network service is a network service provided by a printing apparatus, and the client terminal registered in the network service as a recipient of the event sent from the network service receives from the network service an event indicating a status of the printing apparatus.

5. The client terminal according to claim 1, further comprising a setting unit configured to set enabling/disabling of a reception restriction function of the personal firewall function, and set a permission target, at which reception would be permitted by the personal firewall function of the client terminal, and
    wherein in a case where the enabling of the reception restriction function has been set by said setting unit, and also the reception address is not a permission target, said determination unit determines that the reception address is a reception restriction target.

6. The client terminal according to claim 5, wherein in a case where the disabling of the reception restriction function has been set, or upon condition that the reception address is a permission target even when the enabling of the reception restriction function has been set, said determination unit determines that the reception address is not a reception restriction target.

7. The client terminal according to claim 5, wherein in a case where the registration fails and the permission address is changed, said registration request processing unit tries making the registration request again after the permission target is changed.

8. A method of controlling a client terminal that has a personal firewall function and receives an event which is sent from a network service, comprising:
   determining whether or not a reception address of the client terminal to be used for receiving the event sent from the network service is a reception restriction target, at which reception would be rejected by the personal firewall function of the client terminal; and
   transmitting from the client terminal to the network service a registration request for registering in the network service the client terminal as a recipient of the event sent from the network service,
   wherein upon condition that it is determined that the reception address of the client terminal is a reception restriction target, processing regarding registration of the client terminal as a error processing is terminated without transmitting the registration request to the network service, and
   wherein upon condition that it is determined that the reception address is not a reception restriction target, said request unit transmits the registration request from the client terminal to the network service.

9. The method according to claim 8, wherein the network service is a network service provided by a printing apparatus, and the client terminal registered in the network service as a recipient of the event sent from the network service receives from the network service an event indicating a status of the printing apparatus.

10. A non-transitory computer-readable storage medium storing a client terminal that has a personal firewall function and receives an event which is sent from a network service, wherein the method comprises:
    determining whether or not a reception address of the client terminal to be used for receiving the event sent from the network service is a reception restriction target, at which reception would be rejected by the personal firewall function of the client terminal; and
    transmitting from the client terminal to the network service a registration request for registering in the network service the client terminal as a recipient of the event sent from the network service,
    wherein upon condition that it is determined that the reception address of the client terminal is a reception restriction target, processing regarding registration of the client terminal as a error processing is terminated without transmitting the registration request to the network service, and
    wherein upon condition that it is determined that the reception address is not a reception restriction target, said request unit transmits the registration request from the client terminal to the network service.

11. The storage medium according to claim 10, wherein the network service is a network service provided by a printing apparatus, and the client terminal registered in the network service as a recipient of the event sent from the network service receives from the network service an event indicating a status of the printing apparatus.

* * * * *